(12) United States Patent
Reinhold et al.

(10) Patent No.: US 9,821,474 B2
(45) Date of Patent: Nov. 21, 2017

(54) END EFFECTOR

(75) Inventors: Raphael Reinhold, Wittmund (DE); Eike Jung, Neerstedt (DE)

(73) Assignee: Broetje-Automation GmbH, Rastede (DE)

( * ) Notice: Subject to any disclaimer, the term of this patent is extended or adjusted under 35 U.S.C. 154(b) by 0 days.

(21) Appl. No.: 14/124,551

(22) PCT Filed: Mar. 28, 2012

(86) PCT No.: PCT/EP2012/001347
§ 371 (c)(1),
(2), (4) Date: Feb. 28, 2014

(87) PCT Pub. No.: WO2012/167853
PCT Pub. Date: Dec. 13, 2012

(65) Prior Publication Data
US 2014/0199153 A1    Jul. 17, 2014

(30) Foreign Application Priority Data

Jun. 7, 2011    (DE) .................. 10 2011 106 214

(51) Int. Cl.
*B65H 3/08* (2006.01)
*B25J 15/06* (2006.01)
*B29C 70/38* (2006.01)

(52) U.S. Cl.
CPC ........ *B25J 15/0616* (2013.01); *B65H 3/0816* (2013.01); *B65H 3/0883* (2013.01);
(Continued)

(58) Field of Classification Search
CPC ............ C03B 23/0302; C03B 23/0305; C03B 23/031; C03B 23/0357; C03B 40/005;
(Continued)

(56) References Cited

U.S. PATENT DOCUMENTS 1,279,500 A * 9/1918 Berry ................. B60S 9/12
                                                    254/423
2,729,040 A * 1/1956 Wallace et al. ............ 451/388
(Continued)

FOREIGN PATENT DOCUMENTS

DE    4210024    9/1993

OTHER PUBLICATIONS

International Search Report from International Application No. PCT/EP2012/001347, corresponding to this U.S. Appl. No. 14/124,551, dated Nov. 5, 2012, 2 pages.
(Continued)

*Primary Examiner* — Gregory Adams
(74) *Attorney, Agent, or Firm* — Pauly, DeVries Smith & Deffner LLC

(57) ABSTRACT

The invention relates to an end effector for a manipulator, wherein the end effector interacts with a workpiece, wherein at least one carrier, configured in particular as a carrier plate, for a tool arrangement is provided, and wherein the tool arrangement serves to interact with the workpiece. It is proposed that the carrier is formed at least in part from a deformable material, in particular from an elastically deformable material, and that the carrier is assigned an actuating arrangement, by way of which the carrier is deformable and thus the tool arrangement is orientable in space.

19 Claims, 4 Drawing Sheets

(52) U.S. Cl.
CPC .......... *B29C 70/38* (2013.01); *B65H 2511/17* (2013.01); *B65H 2515/81* (2013.01); *B65H 2555/11* (2013.01); *Y10S 901/40* (2013.01)

(58) Field of Classification Search
CPC ............ C03B 2225/02; C03B 23/0254; C03B 23/0256; C03B 23/033; C03B 23/035; C03B 27/0404; C03B 27/0413; C03B 27/0447; Y10T 29/49622; Y10T 29/49956; Y10T 29/49998; Y10T 29/5108; Y10T 29/5118; Y10T 29/5191; Y10T 29/53191; Y10T 408/55; Y10T 409/30644; B65G 47/91; B65G 47/918; B65G 47/917; B65G 49/085
USPC ....... 269/21, 266; 271/90; 294/185, 188, 65; 414/297, 752.1, 797; 65/106, 273, 287; 901/40
See application file for complete search history.

(56) References Cited

U.S. PATENT DOCUMENTS

| | | | | |
|---|---|---|---|---|
| 3,281,107 | A * | 10/1966 | Lewis .................... | E21D 15/45 254/93 R |
| 3,367,764 | A * | 2/1968 | Seymour ....................... | 65/291 |
| 3,734,464 | A * | 5/1973 | Bushnell, Jr. .......... | F15B 15/16 254/93 R |
| 3,826,485 | A * | 7/1974 | Shindo ....................... | 271/106 |
| 3,865,359 | A * | 2/1975 | Caroli .................. | B25B 11/005 269/21 |
| 4,129,328 | A * | 12/1978 | Littell .................. | B65G 47/918 294/65 |
| 4,297,118 | A * | 10/1981 | Kellar ................. | C03B 23/0357 65/104 |
| 4,470,835 | A * | 9/1984 | Fecik .................. | C03B 23/0357 65/104 |
| 4,487,623 | A * | 12/1984 | Claassen et al. ............... | 65/106 |
| 4,527,783 | A * | 7/1985 | Collora .................. | B23Q 1/032 269/21 |
| 4,579,271 | A * | 4/1986 | Fujita et al. .................... | 228/46 |
| 4,579,577 | A * | 4/1986 | Claassen ......................... | 65/273 |
| 4,741,751 | A * | 5/1988 | Claassen et al. ............... | 65/106 |
| 4,746,348 | A * | 5/1988 | Frank .................. | C03B 23/0305 65/104 |
| 4,775,290 | A * | 10/1988 | Brown et al. .............. | 414/752.1 |
| 4,793,657 | A | 12/1988 | Mense | |
| 4,806,070 | A * | 2/1989 | Poux et al. .............. | 198/750.12 |
| 4,806,140 | A * | 2/1989 | Krug et al. ...................... | 65/290 |
| 4,822,398 | A * | 4/1989 | McMaster et al. ............ | 65/273 |
| 5,578,153 | A * | 11/1996 | Hill .................... | B32B 17/10954 156/106 |
| 5,865,089 | A * | 2/1999 | Langer ................. | F15B 15/1471 901/22 |
| 6,431,623 | B1 * | 8/2002 | Roeters .................. | B65G 47/91 271/90 |
| 6,467,824 | B2 * | 10/2002 | Bolotin ............... | H01L 21/6838 29/743 |
| 6,666,127 | B2 * | 12/2003 | Peles ......................... | A61F 2/68 623/26 |
| 6,868,773 | B2 * | 3/2005 | Davis .................... | F15B 15/103 92/153 |
| 7,444,742 | B2 * | 11/2008 | Sturm, Jr. .............. | B23Q 1/035 269/289 R |
| 7,464,548 | B2 * | 12/2008 | Yson ....................... | F03G 7/065 374/E5.031 |
| 7,607,380 | B2 * | 10/2009 | Hiramatsu ............ | F15B 15/103 91/1 |
| 7,632,452 | B2 * | 12/2009 | Saijo et al. ..................... | 264/630 |
| 2002/0083828 | A1 * | 7/2002 | Bernier ..................... | F04B 9/10 92/92 |
| 2005/0042323 | A1 | 2/2005 | Habisreitinger et al. | |
| 2005/0263949 | A1 * | 12/2005 | Boyl-Davis et al. ......... | 269/266 |
| 2007/0129653 | A1 * | 6/2007 | Sugar ....................... | A61H 1/02 601/5 |
| 2008/0080962 | A1 * | 4/2008 | Holtmeier ..................... | 414/627 |
| 2009/0324366 | A1 * | 12/2009 | Okazaki .................... | B25J 9/142 414/4 |
| 2010/0025532 | A1 | 2/2010 | Herrmann et al. | |

OTHER PUBLICATIONS

Bubert, Edward A. "Highly Extensible Skin for a Variable Wing-Span Morphing Aircraft Utilizing Pneumatic Artificial Muscle Actuation," Masters Thesis, University of Maryland, College Park, 2009 (11 pages).

Festo Group, "Fluidic Muscle DMSP/MAS Product Brochure," www.festo.com, Jun. 2008 (34 pages).

* cited by examiner

ND EFFECTOR

CROSS-REFERENCE TO RELATED APPLICATIONS

This application is a national stage application under 35 U.S.C. 317 of International Patent Application Serial No. PCT/EP2012/001347, entitled "Endeffektor," filed Mar. 28, 2012, which claims priority from German Patent Application No. DE 10 2011 106 214.2, filed Jun. 7, 2011, the disclosures of which are incorporated herein by reference.

FIELD OF THE INVENTION

The invention relates to an end effector, such as a gripping tool and also to a method for handling workpieces.

BACKGROUND

The end effector in question is a manipulator-guided tool, i.e. a tool which is arranged for its intended purpose on a manipulator and in particular is flange-mounted thereon. The manipulator may be any kind of motion apparatus. Frequently, the manipulator is a robot.

The tool is often configured as a gripping tool and is then used for carrying out handling tasks which proceed in an automated manner guided by the manipulator. In this case, the handling of flexible workpieces such as semifinished fiber products or the like places particular requirements on the gripping tool. The handling of such semifinished fiber products plays an important part in the production of fiber composite components. Such fiber composite components are increasingly used in the aviation industry in order to be able to provide structural components such as fuselage shells having a low weight and good mechanical properties (DE 10 2007 003 275 A1).

In the present case, the main focus is on the use of the gripping tool in question in the context of handling tasks, in which a semifinished fiber product as above is deposited in a mold or placed on a mold. In this case, the gripping tool frequently has not only a transporting function but also a draping function. Before the deposition or placement of the workpiece, a draping step is carried out to ensure that the workpiece surface is adapted to the mold surface.

The known gripping tool (DE 101 52 232 A1), on which the invention is based, is equipped with a carrier for a tool arrangement, in this case a gripping arrangement, by way of which retentive engagement with the workpiece to be gripped is producible. The gripping arrangement comprises a number of suction grippers which are each equipped with an actuator and can thus be oriented independently of one another.

Although the fact that every suction gripper is adjustable in a manner free from the other suction grippers theoretically leads to high flexibility when draping the workpiece, challenges arise in terms of drive and control, in particular when the tool is intended to be set for curved or even spherical workpiece surfaces.

SUMMARY

The invention is based on the problem of configuring and developing the known tool for a manipulator such that it can be oriented within a wide range to any desired workpiece surfaces by way of simple structural and control means.

The above problem is solved by the features as described herein.

What is essential is the basic consideration of arranging the tool arrangement on a carrier which is deformable in a targeted manner by means of an actuating arrangement. It has been found that, as a result of this targeted deformation of the carrier, targeted orientation of the tool arrangement in space is also achievable. The deformation of the carrier is transferred to the tool arrangement.

In the case of a configuration of the tool as a gripping tool, the above orientability can be used advantageously during the picking up and during the deposition and placement of workpieces. However, the solution according to the proposal can then also be used for the draping of gripped workpieces. In this case, the deformation of the carrier via the gripping arrangement is transferred in a corresponding manner directly to the workpiece.

Given a suitable design of the mechanical properties of the carrier, even complicated deformation structures can be realized with a simple actuating arrangement. If the carrier is a carrier plate, it is easy to ensure that the carrier plate deforms only along continuous deformation curves, even if the actuating forces act on the carrier only at individual points. The term "carrier plate" should be understood comprehensively in the present case. It includes all substantially sheet-like structures, inter alia also narrow, strip-like carriers or the like.

In an embodiment, the actuating arrangement is equipped with at least one, such as a plurality of actuators, which can be arranged in a manner distributed over the surface of the carrier and are coupled in a corresponding manner via the carrier. By distributing the actuators in a suitable manner, comprehensive deformation structures can be produced in the carrier, as mentioned above.

However, as a result of the coupling of the actuators, not just the settability of different deformation structures of the carrier is rendered easier. Rather, the overall stability of the gripping tool is positively influenced by this coupling.

The tool arrangement can include at least one tool element, wherein the at least one tool element is configured for example as a processing element, as a pressing element, or, as in some embodiments, as a gripping element. The gripping elements, of which there can be a plurality of, are then advantageously arranged in a manner distributed over the surface of the carrier, in order to ensure the optimal orientability of said gripping elements. What is interesting here is the fact that, even in the case of actuators that act only at individual points and gripping elements that act only at individual points, given a suitable design, draping of the gripped workpiece on almost any desired free-form surfaces is possible.

In the case of a plurality of tool elements, in particular a plurality of gripping elements, the solution according to the proposal ensures that the gripping elements are mechanically coupled together. This is reflected in the fact that a deformation of the carrier in the region of a gripping element frequently has an influence on the deformation of the carrier in the region of a further gripping element. In the case of a carrier plate, this coupling can, given a suitable design, result in a substantially tangential arrangement of the gripping elements with respect to a common deformation curve.

In an embodiment, it is the case that, as seen in a projection perpendicular to the surface of the carrier plate, the points of force application of the gripper elements on the workpiece and the points of force application of the actuators on the carrier plate are at least partially spaced apart from one another. It is particularly clear here that the tool elements, in particular the gripping elements, are oriented not directly via the actuating movements of the actuating arrangement but via the deformation of the carrier.

In an embodiment, the tool according to the proposal for a manipulator can easily be constructed in a modular manner in that two or more carriers are combined to form a tool. For this purpose, provision can be made for each carrier to be assigned both a tool arrangement and an actuating arrangement, such that the carriers are able to be operated separately from one another. In order to bring the deformation behavior of the resulting tool closer to the deformation behavior of a tool with only a single carrier, provision is made here in a configuration for the individual carriers to be coupled together via at least one, in particular elastically deformable intermediate element.

In an embodiment, a method for handling deformable workpieces, in particular flexible, sheet-like workpieces, with a gripping tool according to the proposal is claimed.

In the method according to the proposal, in a first step, the workpiece respectively to be handled is gripped by a workpiece storage means, wherein, in a second step, the gripped workpiece is draped by appropriate actuation of the actuating arrangement and wherein, in a third step, the draped workpiece is placed or deposited in a target position.

With the method according to the proposal, it has been found that the orientability of the above workpiece system is advantageous not only when picking up and when depositing or placing, but also when draping the gripped workpiece. Reference may be made to all the embodiments which are suitable for describing or developing the method according to the proposal.

In an embodiment the invention provides an end effector, such as a gripping tool, for a manipulator, wherein the end effector interacts with a workpiece, wherein at least one carrier, can be configured as a carrier plate, for a tool arrangement is provided, and wherein the tool arrangement serves to interact with the workpiece,
wherein the carrier is formed at least in part from a deformable material, such as from an elastically deformable material, and wherein the carrier is assigned an actuating arrangement, by way of which the carrier is deformable and thus the tool arrangement is orientable in space, wherein the at least one actuator is configured as a linear drive, in that the at least one actuator has a tubular section and in that the tubular section can be subjected to an air pressure which effects a change in length of the tubular section and thus generates an actuating movement.

In an embodiment, the tool arrangement is configured as a gripping arrangement, in that retentive engagement with the workpiece is producible by way of the gripping arrangement, and in that the gripping arrangement is orientable in space by way of the deformation of the carrier.

In an embodiment, the workpiece is a deformable workpiece, such as flexible, sheet-like workpiece, or a semifinished product made of fiber composite material, wherein the workpiece is drapable by means of the actuating arrangement in the gripped state.

In an embodiment, the carrier is formed from a plastics or rubber material, or in that the carrier has a flexible mat which is clamped in a frame.

In an embodiment, the carrier is configured as a carrier plate and is deformable at least sectionally into a substantially convex and/or concave form by means of the actuating arrangement, or in that the carrier plate is deformable at least sectionally into a substantially spherical form by means of the actuating arrangement, or in that the carrier plate is deformable at least sectionally into a substantially free form by means of the actuating arrangement.

In an embodiment, the actuating arrangement has at least one, such as up to infinitely adjustable, actuator which acts on the carrier, such as from that side of the carrier that is remote from the workpiece, in order to deform said carrier, in an embodiment a plurality of actuators are provided, which are arranged in a manner distributed over the surface of the carrier.

In an embodiment, a previously reached position is maintainable by means of the actuating arrangement without supply of energy, in an embodiment the actuating arrangement is configured as a pneumatic actuating arrangement and in that the actuating arrangement is pneumatically connected up such that a previously reached position is maintainable without supply of energy.

In an embodiment, the at least one actuator is configured as a unidirectional actuator.

In an embodiment, at least one spring arrangement is provided, which acts on the carrier in parallel with the actuating arrangement, in an embodiment the spring arrangement has at least one spring element, the line of force action of which is aligned substantially with the line of force action of an associated actuator, in an embodiment the at least one actuator configured in an elongate manner and in that the spring element respectively assigned to the actuator is configured as a helical spring which accommodates the actuator.

In an embodiment, the tool arrangement has at least one tool element which is arranged, such as on that side of the carrier that faces the workpiece, in an embodiment a plurality of tool elements are provided, which are arranged in a manner distributed over the surface of the carrier.

In an embodiment, the gripping arrangement has at least one gripping element which is arranged, such as on that side of the carrier that faces the workpiece to be gripped, in an embodiment a plurality of gripping elements are provided, which are arranged in a manner distributed over the surface of the carrier.

In an embodiment, the gripping arrangement is configured as a pneumatic gripping arrangement. In an embodiment, the at least one gripping element is configured as a pneumatic gripping element, such as a suction gripping element.

In an embodiment, as seen in a projection perpendicular to the surface of the carrier plate, the points of force application of the gripper elements on the workpiece to be gripped and the points of force application of the actuators on the carrier plate are at least partially spaced apart from one another.

In an embodiment, a system frame is provided, which accommodates the at least one carrier having an associated tool arrangement and having an associated actuating arrangement. In an embodiment, the system frame has a mechanical and/or electrical interface with a manipulator.

In an embodiment, at least two carriers, each having an associated tool arrangement and each having an associated actuating arrangement, are provided, in an embodiment, two adjacent carriers are coupled together via at least one, such as elastically deformable intermediate element, in an embodiment, the intermediate element is configured as an intermediate plate.

In an embodiment, a method for handling deformable workpieces, such as flexible, sheet-like workpieces, by means of an end effector, wherein, in a first step, the workpiece respectively to be handled is gripped, wherein, in a second step, the gripped workpiece is draped by appropriate actuation of the actuating arrangement, and wherein, in a third step, the draped workpiece is deposited or placed in a target position.

BRIEF DESCRIPTION OF THE DRAWINGS

The invention is explained in more detail in the following text with reference to a drawing that illustrates only one exemplary embodiment. In the drawing.

DETAILED DESCRIPTION

Figure 1:
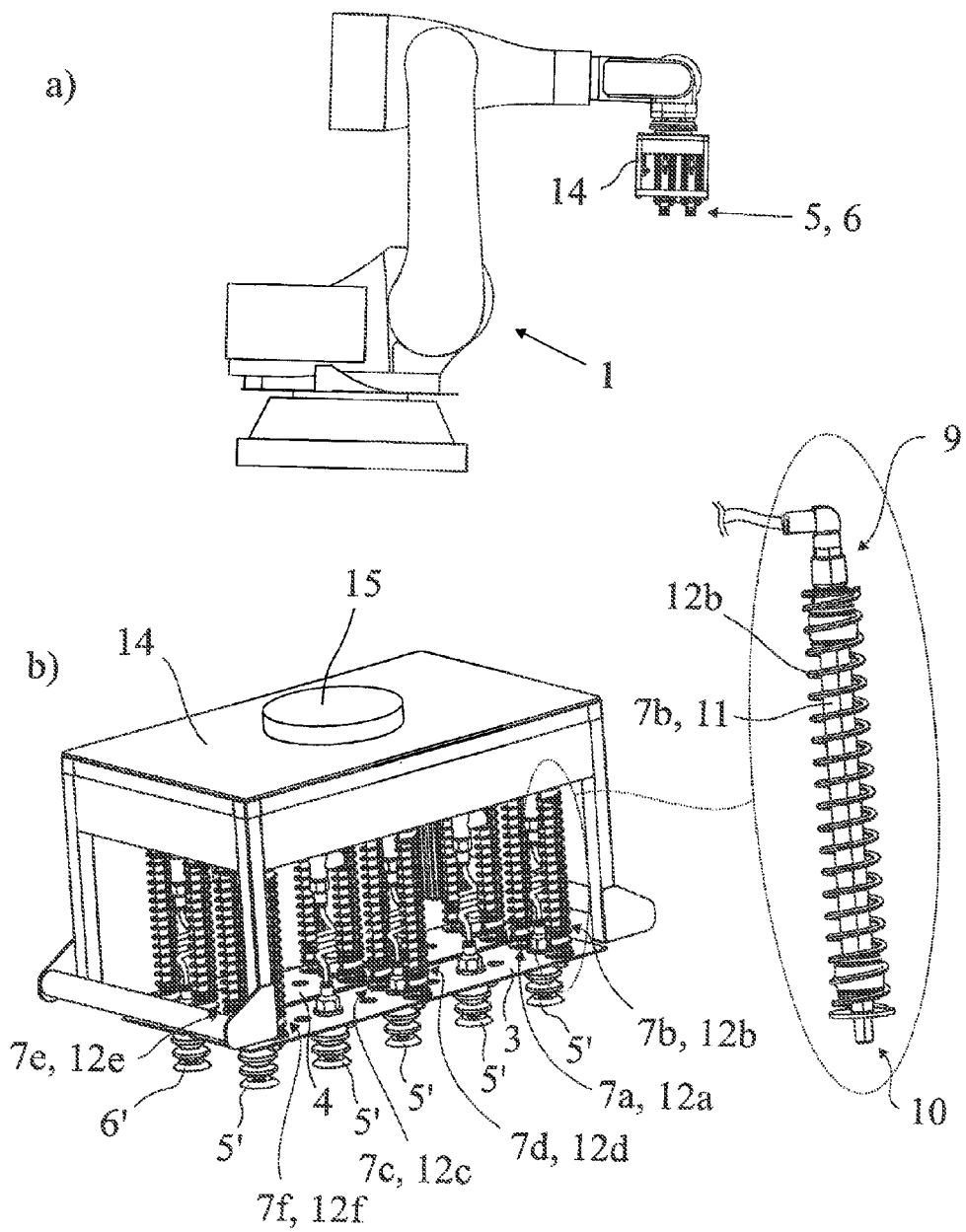
FIG. 1 shows a) a gripping tool according to the proposal, which is flange-mounted on a manipulator, and b) the gripping tool according to a) in a perspective view obliquely from above.

The proposed end effector, which is a manipulator-guided tool, may be designed for any desired tasks. Examples of these are gripping, grinding, milling, cutting, adhesive-bonding, heat-treatment or measurement tasks. In all cases, the tool has at least one carrier 3, 4, configured in particular as a carrier plate, for a tool arrangement 5, 6, wherein the tool arrangement 5, 6 serves very generally to interact with the workpiece 2.

The end effector illustrated in the drawing is configured as a gripping tool for the manipulator-guided gripping of workpieces 2. All of the following embodiments relating to a gripping tool are likewise applicable for all other types of tool types that can be used here.

The workpieces can be semifinished fiber products. This, too, should not be understood as being limiting. The gripping tool according to the proposal can be used for all conceivable handling operations that proceed in particular in an automated manner.

The gripping tool illustrated in the drawing has at least one carrier 3, 4, can be two carriers 3, 4. In principle, any desired number of carriers 3, 4 can be combined in a modular manner with one another, as will be explained below.

Each carrier 3, 4 is assigned a gripping arrangement 5, 6 (FIG. 3), wherein retentive engagement with the workpiece 2 to be gripped is producible by the respective gripping arrangement 5, 6, as will be explained below.

Viewing FIGS. 2a and 2b together shows that the carriers 3, 4 are each formed from a deformable material. In principle, it is also conceivable for the carriers 3, 4 to be formed only in part from a deformable material. In an embodiment, it is also the case that the carriers 3, 4 are formed from an elastically deformable material, such that the carriers 3, 4 also have the effect of a restoring spring.

The carriers 3, 4 are each assigned an actuating arrangement 7, 8 (FIG. 3), by way of which the respective carrier 3, 4 is correspondingly deformable and thus the respective tool arrangement 5, 6, in this case the respective gripping arrangement 5, 6, is orientable in space. FIG. 2b shows the oriented state.

It has already been noted that the workpiece 2 to be gripped can be a deformable workpiece 2, such as a flexible and sheet-like workpiece 2. In the context of the production of fiber composite components, on which the main focus is here, the workpiece 2 is a semifinished product made of fiber composite material. In all cases the workpiece 2 can be drapable in the gripped state by means of the actuating arrangement 7, 8.

In principle, the carriers 3, 4 can be produced from thin sheet metal, in particular from spring steel. However, provision can be made for the carriers 3, 4 to be formed from a plastics or rubber material. In the exemplary embodiment illustrated, the carriers 3, 4 have sufficient inherent stability such that they are mounted only via the actuating arrangement 7, 8. However, it is also conceivable for the carriers 3, 4 to have a flexible mat, in particular a flexible rubber mat, which is clamped in each case in a frame and is deformable by means of an actuating arrangement 7, 8.

By suitable actuation of the actuating arrangement 7, 8, almost any desired forms of the carrier 3, 4 configured as a carrier plate can be set. This can be gathered best from the schematic illustrations according to FIG. 4.

Convex forms (FIG. 4a), concave forms (FIG. 4b) and free forms such as twisted surfaces (FIG. 4c) can be produced with one and the same carrier 3, 4 configured as a carrier plate. Given a suitable design, it is also conceivable, according to FIG. 4d, to deform the carrier 3, 4 in the form of a carrier plate, in this case both carriers 3, 4 in each case into a substantially spherical form (FIG. 4d).

The above deformation of the carriers 3, 4 can be based on force actions by the actuating arrangements 7, 8 at individual points on the carriers 3, 4. In order to apply these forces, the actuating arrangements 7, 8 can be each equipped with a plurality of in particular infinitely adjustable actuators 7a-f, 8a-f which act on the carrier 3, 4, from that side of the respective carrier 3, 4 that is remote from the workpiece 2, in order to deform said carrier 3, 4. In principle, it is also conceivable here for only one actuator 7, 8 to be provided.

Figure 4:
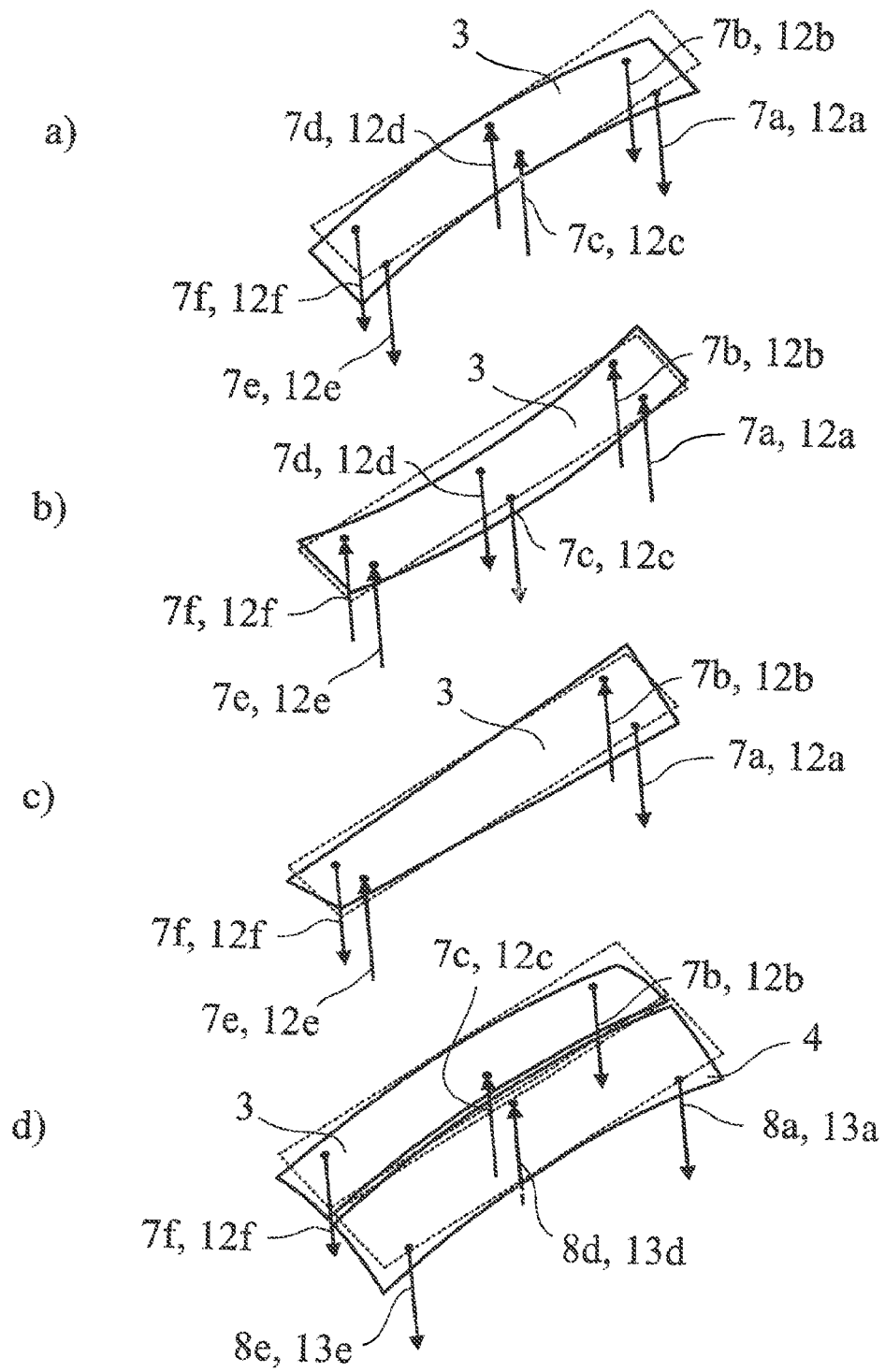
FIG. 4 shows a schematic illustration, in each case in the disassembled state, of a)-c) a carrier of the gripping tool according to FIG. 1 in the case of convex deformation, in case of concave deformation and in the case of a free-surface deformation and d) both carriers of the gripping tool according to FIG. 1 in the case of a spherical deformation.

FIGS. 4a-c show, for the carrier 3, which force actions are to be applied in order to achieve the deformation desired in each case. The force actions are illustrated by arrows in FIG. 4, said arrows each being denoted with the reference signs of the corresponding actuators 7a-f and the spring elements 12a-f to be explained below. What is essential here is that opposing forces have to act in a spatially offset manner on the carrier 3 for the deformation. This is because the carriers 3, 4 interact substantially only with the respective actuating arrangement 7, 8 and are not supported elsewhere, as will be explained below.

FIG. 4d shows the two carriers 3, 4, which are coupled together, as will be explained below, and undergo a spherical deformation. In this case, in particular the flexibility in tool orientation that can be achieved with the solution according to the proposal can be seen.

For the purpose of simple and energy-efficient actuation of the actuating arrangements 7, 8, provision can be made for the position previously reached by the actuating arrangements 7, 8, for example a position illustrated in FIGS. 4a-c, to be maintained without supply of energy. This can be realized for example in that the actuators 7a-f, 8a-f are configured in a self-locking manner.

However, in the exemplary embodiment illustrated, the actuating arrangements 7, 8 are each configured as a pneumatic actuating arrangement which is pneumatically connected up such that the above self-locking action is correspondingly implemented. This can be realized for example in that a nonreturn valve is connected into the pneumatic drive line of the respective actuator 7a-f, 8a-f, said nonreturn valve preventing undesired venting of the respective actuator 7a-f, 8a-f.

In order to actuate the actuators 7*a-f*, 8*a-f*, a single proportional pressure control valve (not illustrated here) can be provided, by way of which the supply pressure can be lowered to any desired pressure values. In order to actuate the actuators 7*a-f*, 8*a-f*, the starting pressure of the proportional pressure control valve is connected through to the respective actuator 7*a-f*, 8*a-f* via a valve control. If the same pressure is intended to be applied to two actuators 7*a-f*, 8*a-f*, these actuators 7*a-f*, 8*a-f* are correspondingly connected up simultaneously at the outlet pressure of the proportional pressure control valve. In principle, any actuator 7*a-f*, 8*a-f* can also be assigned such a proportional pressure control valve, this having an unfavorable effect on the weight of the end effector as a whole, however. After the respective actuator 7*a-f*, 8*a-f* has been adjusted, the actuator 7*a-f*, 8*a-f* is connected up by way of a nonreturn valve such that the previously reached position is maintained without supply of energy, as explained above.

It can be gathered from the illustration according to FIG. 4 that the actuating arrangements 7, 8 have to generate actuating forces for the deformation of the carriers 3, 4, said actuating forces acting, at least in one force component, substantially perpendicularly to the surface of the carrier 3, 4. For this purpose, provision can be made for the at least one actuator 7*a-f*, 8*a-f* to be configured as a linear drive. Such a linear drive 7*a-f*, 8*a-f* is illustrated in the detail illustration in FIG. 1*b*.

In principle, the linear drive 7*a-f*, 8*a-f* in question may be an electrical spindle drive, a pneumatic piston drive or the like.

However, it can be the case that the at least one actuator 7*a-f*, 8*a-f* has a tubular section 11 between two drive connections 9, 10, a particular air pressure optionally being able to be applied to said tubular section 11. Given appropriate application of pressure, a change in length of the tubular section 11 results and thus the generation of a linear actuating movement. Such linear drives are also known as "pneumatic muscles". In this respect, reference is made to the company brochure "Fluidic Muscle DMSP/MAS" of the company Festo AG & Co. KG, 2010/12.

In the exemplary embodiment illustrated, the actuators 7*a-f*, 8*a-f* having their respectively tubular sections are oriented substantially perpendicularly to the surface of the carrier plate 3, 4. However, in principle, any other orientation is conceivable, in particular when a deflecting element or the like is interconnected between the actuator 7*a-f*, 8*a-f* and the carrier plate 3, 4.

What is interesting in the above, muscle-like actuators 7*a-f*, 8*a-f* is also the fact that the actuators 7*a-f*, 8*a-f* readily allow infinite adjustment, in order that the deformation of the carrier 3, 4 can be carried out in a correspondingly infinite manner. The infinite adjustment advantageously takes place without a "stick-slip" effect, it being possible to dispense with lubrication on account of the lack of friction bearings.

Instead of the above actuators 7*a-f*, 8*a-f* that act from the outside on the carrier 3, 4, it is in principle possible for use to be made of actuators which are integrated in the carrier 3, 4. For example, the actuating arrangement 7, 8 can have a plurality of piezo elements which interact with the carrier 3, 4 and in particular are integrated in the carrier 3, 4.

In principle, the actuators 7*a-f*, 8*a-f* can be configured as bidirectional actuators. However, for the purpose of a structurally simple and thus cost-effective configuration, provision can be made for the actuators 7*a-f*, 8*a-f* to be configured as unidirectional actuators. In order nevertheless to be able to generate force actions in opposing directions, these being of course necessary for the deformation discussed above of the carrier 3, 4, provision is can be made in this case of a spring arrangement 12, 13 which acts on the carrier 3, 4 in parallel with and optionally in the opposite direction to the actuating arrangement 7, 8. In FIG. 4, as indicated above, the arrows indicate in each case the force actions which result from the combination of the actuator force and the spring force.

The spring arrangement 12, 13 has at least one spring element 12*a-f*, 13*a-f*, the line of force action of which is aligned substantially with the line of force action of an associated actuator 7*a-f*, 8*a-f*. Specifically, it is the case here that the actuators 7*a-f*, 8*a-f* are configured in an elongate manner and that the spring element 12*a-f*, 13*a-f* respectively associated with the respective actuator 7*a-f*, 8*a-f* is configured as a helical spring which accommodates the respective actuator 7*a-f*, 8*a-f*.

Numerous possibilities are conceivable for the configuration of the tool arrangement 5, 6. In an embodiment, the tool arrangement 5, 6 has at least one tool element 5', 6' which is arranged in particular on that side of the carrier 3, 4 that faces the workpiece 2.

Provision can be made of a plurality of tool elements 5', 6' which are arranged in a manner distributed over the surface of the carrier 3, 4. The tool elements 5', 6' may, as illustrated in the drawing, be gripping elements, but may also be for example tool elements for grinding, milling, cutting, adhesive-bonding, heat treatment, measuring, and the like.

In the exemplary embodiment which is illustrated, the gripping arrangement 5, 6 has a total of five gripping elements 5', 6', which in this case and can be arranged on that side of the carrier 3, 4 which faces the workpiece 2 to be gripped. This plurality of gripping elements 5', 6' are distributed over the surface of the carrier 3, 4 such that the orientation according to the proposal of the gripping arrangement 5, 6 can be brought about by the deformation of the carrier 3, 4.

Numerous variants are likewise conceivable for realizing the gripping elements 5', 6'. For example, the gripping elements 5', 6' may be configured as pincer grippers, needle grippers, freezing grippers or the like. However, in this case the gripping arrangement 5, 6 is configured as a pneumatic gripping arrangement, wherein the gripping elements 5', 6' are correspondingly configured as pneumatic gripping elements, in this case as suction gripping elements.

From a structural point of view, the gripping tool according to the proposal is particular interesting, since the gripping elements 5', 6' can be arranged in almost any desired manner on the respective carrier 3, 4. The illustration according to FIG. 3 reveals that, as seen in a projection perpendicular to the surface of the carrier plate 3, 4, the points of force application of the gripping elements 5', 6' on the workpiece 2 to the gripped and the points of force application of the actuators 7*a-f*, 8*a-f* on the carrier plate 3, 4 are at least partially spaced apart from one another. This spacing has been provided by way of example with the reference sign "a" in FIG. 3.

Figure 2:
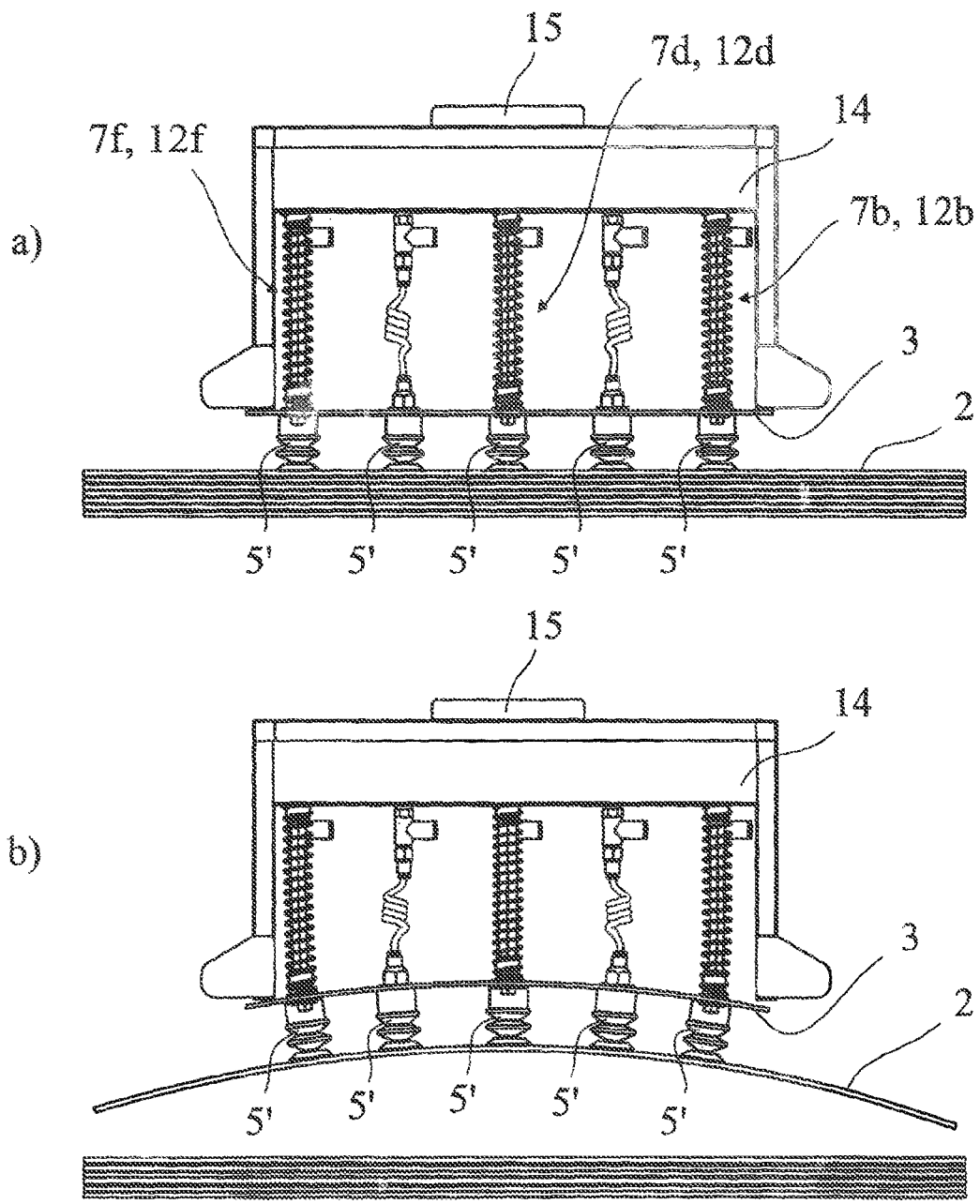
FIG. 2 shows the gripping tool according to FIG. 1 a) in the basic state and b) in the oriented state, in each case in a side view.
Figure 3:
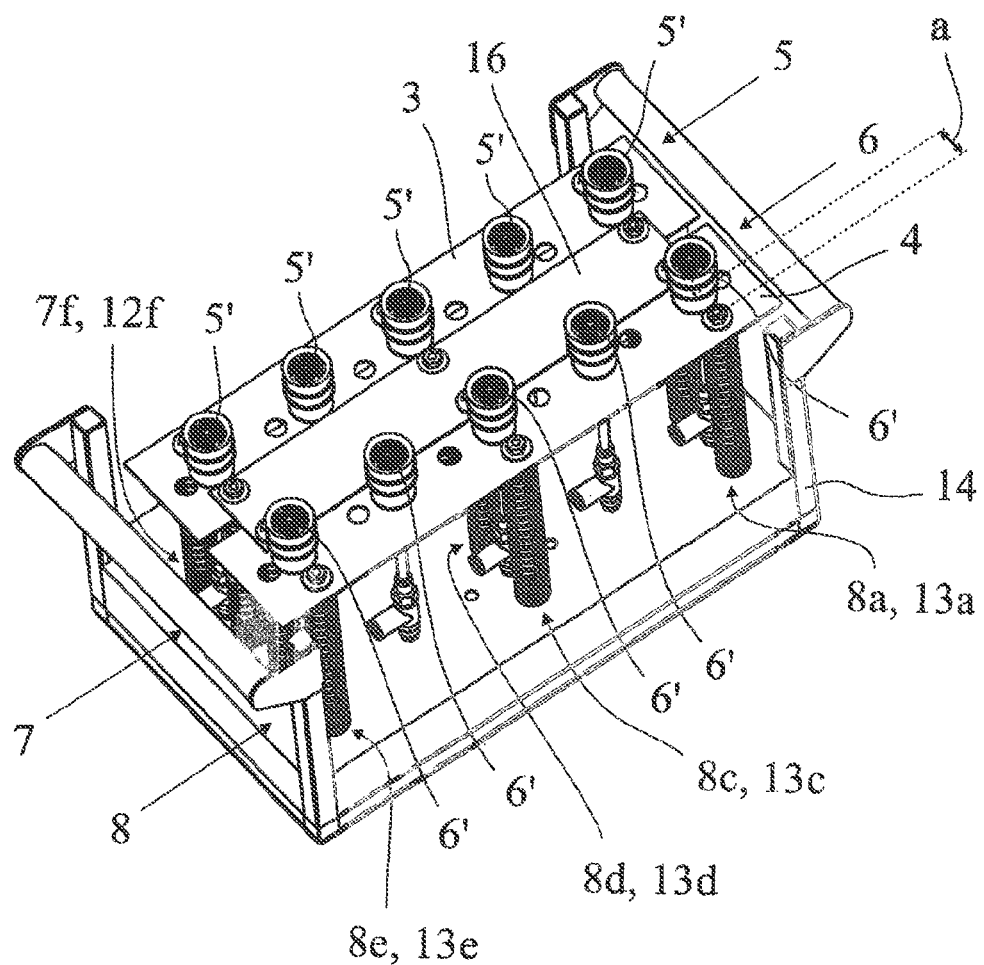
FIG. 3 shows the gripping tool according to FIG. 1 in a perspective view obliquely from below.

A detail worth mentioning in the structural configuration illustrated in FIGS. 1 to 3 is the pneumatic connection of the gripping elements 5', 6'. In an embodiment, provision can be made for the pneumatic feed line to be formed at least sectionally in a spiral-shaped manner, in order to allow a length compensation that may be necessary as a result of the deformation of the carrier 3, 4.

The constructive structure as a whole of the end effector illustrated in the drawing is advantageous with regard to a modular construction. Specifically, the gripping tool is equipped with a system frame 14 which accommodates the carriers 3, 4 with a respectively associated tool arrangement 5, 6, in this case a gripping arrangement 5, 6, and having a respectively associated actuating arrangement 7, 8. Here, the system frame 14 has in this case a mechanical and/or electrical interface 15 with the above-described manipulator 1.

The illustration according to FIG. 3 shows in detail that the tool according to the proposal having a system frame 14 is expandable in a modular manner. This is based substantially on the fact that, as mentioned above, each carrier 3, 4 is assigned in each case a separate tool arrangement 5, 6, in this case a gripping arrangement 5, 6, and a separate actuating arrangement 7, 8.

Provision can be made of at least two carriers 3, 4 equipped in this way, which are coupled together via at least one, in particular elastically deformable intermediate element 16, wherein the intermediate element 16 is configured in this case as an intermediate plate. It is readily conceivable for a tool to be equipped not just with two modules, but with three modules, wherein each module has of one carrier 3, 4, one tool arrangement 5, 6, in this case a gripping arrangement 5, 6, assigned to the carrier 3, 4, and one actuating arrangement 7, 8 assigned to the carrier 3, 4. The modules are each, as discussed above, coupled together via at least one, in particular elastically deformable intermediate element 16.

Viewing FIGS. 2 and 3 together shows that the carriers 3, 4 are arranged on the system frame 14 only via the actuating arrangement 7, 8 and are otherwise adjustable in a manner free from the system frame 14. This results in maximum degrees of freedom in the deformation of the carriers 3, 4. However, it may also be advantageous for the carriers 3, 4 themselves to be supported on the system frame 14. In this way, if necessary, particularly high mechanical stability can be ensured for the gripping arrangement 5, 6.

According to a further teaching, which likewise has independent meaning, a method for handling deformable workpieces 2, in this case flexible, sheet-like workpieces 2, is claimed, said method being carried out by means of a gripping tool as above. The method according to the proposal can serve for handling semifinished fiber products in the context of the production of fiber composite components.

In a first step, the workpiece 2 to be handled in each case is gripped from a workpiece store or the like. This situation corresponds to the situation illustrated in FIG. 2a. In this case, the workpiece 2 is usually formed in a planar manner so that a deformation of the carrier 3, 4 is not necessary. In a second step, the gripped workpiece 2 is draped by actuation, as described above, of the actuating arrangement 7, 8, as is illustrated in FIG. 2b. The draping is based on an above-described deformation of the carriers 3, 4 by means of the actuating arrangement 7, 8. Finally, in a third step, the draped workpiece 2 is deposited or placed in a target position. This third step is not illustrated in the drawing, since it is primarily based on an adjustment of the manipulator 1, in this case of the robot 1.

It can be seen particularly clearly from the method according to the proposal that the gripping tool according to the proposal allows particularly high versatility with simple constructive means. The actuation of the actuating arrangement 7, 8 can also be realized with simple means, in that the orientation of the gripping arrangement 5, 6 is learned in a learning operation and stored and is accordingly retrieved during operation. Reference may be made to all the statements made with respect to the gripping tool according to the proposal which relate to an explanation or development of the method according to the proposal.

On account of its simple constructive structure, the end effector according to the proposal can be realized with a particularly low weight, this being particularly advantageous in the context of use on a manipulator 1. This is particularly true when the muscle-like actuators 7a-f, 8a-f discussed above are used.

A manipulator 1 which is equipped with an end effector according to the proposal, in particular with a gripping tool according to the proposal, is also intended to be claimable as such. In this respect, reference may be made to all the above statements.

The invention claimed is:

1. An end effector for a manipulator, wherein the end effector interacts with a workpiece, comprising:
   at least one carrier for a tool arrangement, and wherein the tool arrangement serves to interact with the workpiece,
   wherein the carrier is formed at least in part from a deformable material, and wherein the carrier is assigned an actuating arrangement, by way of which the carrier is deformable and thus the tool arrangement is orientable in space,
   wherein the actuating arrangement comprises a plurality of pneumatic muscle actuators, wherein each of the pneumatic muscle actuators is a pneumatic muscle and is configured as a linear drive, wherein each of the pneumatic muscle actuators has a tubular section that can be subjected to an air pressure which changes the length of the tubular section and thus generates an actuating movement,
   wherein the tubular section of each of the plurality of pneumatic muscle actuators is oriented substantially perpendicular to a surface of the carrier.

2. The end effector as claimed in claim 1, wherein the tool arrangement is configured as a gripping arrangement, in that retentive engagement with the workpiece is producible by way of the gripping arrangement, and in that the gripping arrangement is orientable in space by way of the deformation of the carrier.

3. The end effector as claimed in claim 2, wherein the workpiece is a deformable workpiece, wherein the workpiece is drapable by the actuating arrangement in the gripped state.

4. The end effector as claimed in claim 2, wherein the gripping arrangement has at least one gripping element which is arranged on the carrier.

5. The end effector as claimed in claim 4, wherein the gripping arrangement is configured as a pneumatic gripping arrangement.

6. The end effector as claimed in claim 5, wherein the at least one gripping element is configured as a pneumatic gripping element.

7. The end effector as claimed in claim 1, wherein the carrier is formed from a plastics or rubber material.

8. The end effector as claimed in claim 7, wherein the carrier has a flexible mat which is clamped in a frame.

9. The end effector as claimed in claim 1, wherein the carrier is configured as a carrier plate and is deformable at least sectionally into a substantially convex and/or concave form by the actuating arrangement.

10. The end effector as claimed in claim 1, wherein a previously reached position is maintainable by the actuating arrangement without supply of energy.

11. The end effector as claimed in claim 10, wherein the actuating arrangement is pneumatically connected up such that a previously reached position is maintainable without supply of energy.

12. The end effector as claimed in claim 1, wherein each of the pneumatic muscle actuators is configured as a unidirectional actuator.

13. The end effector as claimed in claim 1, wherein at least one spring arrangement is provided, which acts on the carrier in parallel with the actuating arrangement.

14. The end effector as claimed in claim 1, wherein the tool arrangement has at least one tool element which is arranged on the carrier.

15. The end effector as claimed in claim 1, wherein, as seen in a projection perpendicular to the surface of the carrier plate, the points of force application of the gripper elements on the workpiece to be gripped and the points of force application of the pneumatic muscle actuators on the carrier plate are at least partially spaced apart from one another.

16. The end effector as claimed in claim 1, wherein a system frame is provided, which accommodates the at least one carrier having an associated tool arrangement and having an associated actuating arrangement.

17. The end effector as claimed in claim 1, wherein at least two carriers, each having an associated tool arrangement and each having an associated actuating arrangement, are provided.

18. The end effector as claimed in claim 1, wherein two adjacent carriers are coupled together via at least one elastically deformable intermediate element.

19. A method for handling deformable workpieces with the end effector of claim 1, comprising:
gripping the workpiece respectively to be handled,
draping the gripped workpiece by appropriate actuation of the actuating arrangement, and
depositing or placing the draped workpiece in a target position.

* * * * *